US006119870A

United States Patent [19]

Maciejewski et al.

[11] Patent Number: 6,119,870

[45] Date of Patent: Sep. 19, 2000

[54] CYCLOSEPARATOR FOR REMOVAL OF COARSE SOLIDS FROM CONDITIONED OIL SAND SLURRIES

[75] Inventors: Waldemar Maciejewski; George Cymerman, both of Edmonton, Canada

[73] Assignees: AEC Oil Sands, L.P.; AEC Oil Sands Limited Partnership; Athabasca Oil Sands Investments, Inc.; Canadian Occidental Petroleum Ltd.; Canadian Oil Sands Investments, Inc.; Gulf Canada Resources Limited; Imperial Oil Resources, all of Calgary, Canada; Mocal Energy Limited, Tokyo, Japan; Murphy Oil Company, Ltd.; Petro-Canada, both of Calgary, Canada

[21] Appl. No.: 09/150,083

[22] Filed: Sep. 9, 1998

[51] Int. Cl.[7] ................................ B03B 5/28; B04C 5/13; B04C 5/18; B01D 21/26

[52] U.S. Cl. .......................... 209/725; 209/730; 209/731; 210/512.1; 210/787; 210/788

[58] Field of Search ................................ 209/3, 12.1, 17, 209/210, 724, 725, 727, 730, 731; 210/512.1, 787, 788

[56] References Cited

U.S. PATENT DOCUMENTS

| | | | |
|---|---|---|---|
| Re. 26,720 | 11/1969 | Visman . | |
| 2,538,870 | 1/1951 | Hunter . | |
| 2,717,695 | 9/1955 | Martin . | |
| 2,910,424 | 10/1959 | Tek et al. . | |
| 3,289,608 | 12/1966 | Laval, Jr. . | |
| 3,512,651 | 5/1970 | Laval, Jr. . | |
| 3,568,837 | 3/1971 | Laval, Jr. . | |
| 3,701,425 | 10/1972 | Laval, Jr. . | |
| 3,935,076 | 1/1976 | Cymbalisty . | |
| 3,947,364 | 3/1976 | Laval, Jr. . | |
| 3,963,073 | 6/1976 | Laval, Jr. . | |
| 4,072,481 | 2/1978 | Laval, Jr. . | |
| 4,120,795 | 10/1978 | Laval, Jr. . | |
| 4,140,638 | 2/1979 | Laval. Jr. . | |
| 4,147,630 | 4/1979 | Laval, Jr. . | |
| 4,148,735 | 4/1979 | Laval, Jr. . | |
| 4,175,036 | 11/1979 | Frykhult | 210/512.1 |
| 4,265,741 | 5/1981 | Im . | |
| 4,464,264 | 8/1984 | Carroll | 210/512.1 |
| 4,544,486 | 10/1985 | Carroll | 210/512.1 |
| 4,683,061 | 7/1987 | Carroll | 210/512.1 |
| 4,719,014 | 1/1988 | Carroll | 210/512.1 |
| 4,810,382 | 3/1989 | Colman et al. | 210/512.1 |
| 4,838,434 | 6/1989 | Miller . | |
| 4,857,197 | 8/1989 | Young et al. . | |
| 4,971,685 | 11/1990 | Stanley et al. | 210/512.1 |
| 5,008,014 | 4/1991 | Lloyd et al. | 210/512.1 |
| 5,028,318 | 7/1991 | Aslin . | |
| 5,108,608 | 4/1992 | Carroll | 210/512.1 |
| 5,116,519 | 5/1992 | Michaluk | 210/512.1 |
| 5,316,664 | 5/1994 | Gregoli et al. . | |
| 5,769,243 | 6/1998 | McCarthy | 209/725 |
| 5,814,230 | 9/1998 | Willis et al. | 209/725 X |

FOREIGN PATENT DOCUMENTS

| | | |
|---|---|---|
| 970309 | 7/1975 | Canada . |
| 0 029 553 | 6/1981 | European Pat. Off. . |
| 0 047 135 | 3/1982 | European Pat. Off. . |
| PCT/NL91/00095 | 12/1991 | WIPO . |

*Primary Examiner*—Donald P. Walsh
*Assistant Examiner*—Brett C. Martin
*Attorney, Agent, or Firm*—Millen, White, Zelano & Branigan, P.C.

[57] ABSTRACT

A large capacity cyclonic separator is used for desanding a conditioned aqueous oil sand slurry comprising aerated bitumen, water and sand to produce pumpable, pipelineable lean froth and sand tailings. The cyclone separator is a vessel which forms an elongated cylindrical separation chamber and has a tangential slurry inlet at one end and, at the opposite end, a peripheral sand removal outlet and a centrally positioned vortex finder. Oil sand slurry is continually tangentially introduced into the cyclone separator to form a rotating vortex, which generates a centrifugal force. The lean froth migrates to the center of the vortex to form an inner core and is removed via the vortex finder. The sand tailings migrate to the outer reaches of the vortex and are co-currently is removed via the sand removal outlet.

16 Claims, 3 Drawing Sheets

CYCLOSEPARATOR FOR REMOVAL OF COARSE SOLIDS FROM CONDITIONED OIL SAND SLURRIES

FIELD OF THE INVENTION

The present invention relates to the separation of coarse solids from conditioned oil sand slurries and relates more particularly to the use of a large capacity, cylindrical cyclonic separator capable of processing dense oil sand slurries, containing large lumps, to produce lean froth and sand tailings. The process involves co-current centrifugal separation with both sand and lean froth products flowing in the same direction in a centrifugal force.

BACKGROUND OF THE INVENTION

Oil sand, as known in the Fort McMurray region of Alberta, Canada, comprises water-wet sand grains having viscous bitumen flecks trapped between the grains. It lends itself to separating or dispersing the bitumen from the sand grains by slurrying the as-mined oil sand in heated water so that the bitumen flecks move into the aqueous phase.

For the past 25 years, the bitumen in McMurray sand has been commercially recovered from oil sand using a heated water process. In general terms, the hot water process that is practiced at applicants plant today involves:

supplying heated water at the mine site;

mixing the dry as-mined oil sand with the heated water at the mine site in predetermined proportions using a device known as a "cyclofeeder", to form a slurry of controlled density having a temperature in the order of 50° C.;

screening the slurry to remove oversize solids too large to be fed to the pipeline;

pumping the slurry to the extraction plant through several kilometers of pipeline;

further diluting the slurry with heated water; and separating the bitumen from the rest of the oil sand slurry using gravity separation vessels and flotation cells.

A recent development in the recovery of bitumen from oil sand involves a low energy extraction process (LEE process). The LEE process involves:

dry mining the oil sand;

mixing the as-mined oil sand with water in predetermined proportions near the mine site to produce a slurry having a controlled density in the range 1.4 to 1.65 g/cc and a temperature in the range 20–35° C.;

pumping the slurry from the mine site to the extraction plant through a pipeline having a plurality of pumps spaced along its length;

adding air to the slurry, preferably in the pipeline after the last pump, in an amount up to 2.5 volumes of air per volume of slurry, to form an aerated slurry; and separating the bitumen from the rest of the oil sand slurry using gravity separation vessels and flotation cells.

In both of the aforementioned processes, much of the conditioning of the oil slurry takes place in the pipeline. Here, the larger lumps of oil sand are ablated and the released bitumen flecks coalesce and attach to air bubbles. At this stage the slurry is commonly referred to as "conditioned slurry". Once the slurry reaches the extraction site, the aerated bitumen is then separated from the rest of the oil sand slurry using gravity separation and flotation. Primary separation of the bitumen from the solids occurs in large capacity gravity settlers called primary separation vessels (PSVs), where the slurry is divided into primary bitumen froth, middlings (water, fines and bitumen) and coarse tailings (coarse solids, water, and residual bitumen). The bitumen still remaining in the middlings fraction is recovered in flotation cells where air is added and further separation of bitumen from solids occurs. The tailings that are separated are then transported to sand disposal sites.

As the mining area increases in the Fort McMurray region, the location of mining faces and the location of the sand disposal sites become more and more remote from the extraction plant. The extraction plant is comprised of a number of very large PSVs, TOR settling tanks, flotation cells, etc. Therefore, its location must remain permanent, as the equipment cannot be readily moved. Also, the cost of building new extraction plants at various other sites would be prohibitive. Therefore, slurry that is produced at a remote mine site will have to travel a great distance to the stationary extraction plant and therefore longer pipelines will be required. Further, once separation has occurred at the extraction site, the tailings will have to be transported to sand disposal sites that may also be a long distance from the extraction site. The bulk of the slurry (i.e. 50 to 60% by mass) is sand which must be transported first to extraction sites and then to disposal sites. All of this is costly. Clearly it would be much more cost effective if the sand could be separated from the conditioned slurry at a location closer to the mining site, the disposal site, or both. Therefore, a portable sand separator has been developed to separate the coarse tailings from the bitumen and middlings at a convenient location at the time. The process of removing coarse sand from an oil sand aqueous slurry is commonly referred to as "desanding".

Several factors have to be considered when developing a portable sand separator. The oil sand slurry in question, having been prepared by either of the two methods described above, is a unique feed stock. The slurry tends to be very dense (on average 1.6 sg) and contains a considerable amount of solids including rocks up to 4 inches in any dimension. Therefore, it is necessary to have a separator that can handle slurries with high concentrations of solids and large objects in both the feed and the effluent.

In addition, oil sand slurry varies with respect to its solids, water and bitumen content depending upon the oil sand grade, the process used to produce the slurry, the time of year the slurry is prepared, etc. (a slurry can contain anywhere from 50 to 65 wt % solids, 25 to 40 wt % water and 5 to 10 wt % bitumen). Therefore, it is necessary to have a separator that is capable of being controlled so that the volumetric split between the effluent (the heavy phase) and the centrate (the light phase) can be manipulated. Also, very large volumes of oil sand slurry are continuously being produced and pumped through pipelines with an inner diameter of 24 to 30 inches. Therefore, if a separator were to be hooked up directly to a pipeline, it would have to be capable of handling volumetric flow rates in the order of 25,000 to 40,000 U.S. GPM.

Finally, it is desirable that the separator be capable of separating substantially all solids larger than 44 microns or greater from the remainder of the slurry including middlings and bitumen froth.

There are no commercially available cyclonic separators that are capable of handling the large volumetric flow rates required and still reject most coarse solids. For example, there are many conical cyclonic separators on the market that are capable of removing solids as small as 44 microns. However, the flow rate range of these separators is only 200 to 1,000 U.S. GPM. Therefore, in order to accommodate the volume of slurry in question, one would have to use a cluster of such separators. For instance, if one were to use a separator with a capacity of 300 U.S. GPM, approximately 130 separators would be needed to handle 40,000 U.S. GPM of slurry. Further, the cluster would require a separate feed distributor, manifolds with shut off valves, overflow and underflow sumps and support structures with access platforms. Therefore, a complete installation of such a cluster of separators is both complex and costly.

There are other commercially available cyclonic separators that can handle larger flow rates (up to 10,000 U.S. GPM). However, these separators are unable to provide the desired separation as they can only separate out solids coarser than 150 to 250 microns. Further, these separators are not designed to handle dense slurries or handle slurries containing particles with diameters larger than 1 inch.

The use of a cyclonic separator for the separation and recovery of oil from oil sands has been previously taught. Canadian Patent No. 970,309 issued to Davitt and U.S. Pat. No. 5,316,664 issued to Gregoli et al both teach a process for recovering bitumen from tar sands using a conical hydrocyclone. However, the volume of slurry that can be accommodated by these conical hydrocyclones is limited and a series of hydrocyclones is necessary to handle the volumes in question.

In U.S. Pat. No. 2,910,424 issued to Tek et al, a conical hydrocyclone is used to separate oil from oil sands. However, in order for this hydrocyclone to work, the oil sand feed must first be comminuted in a ball mill, hammer mill, jaw crusher, etc. so that there are no large lumps and the material introduced into the hydrocyclone is composed of particles smaller than 1 mm in diameter. This design would not be capable of handling the oil sand slurries in question.

SUMMARY OF THE INVENTION

The present invention relates to a cyclonic separator and a process for desanding oil sand slurry thus rendering a stream of lean bitumen froth (i.e. bitumen froth containing less than about 15% solids and more than 10% bitumen).

One of the objectives of the present invention was to develop a sand separator suitable for use in hydrotransport-based oil sand transport and conditioning processes. In one such process, oil sand is slurried with heated water in a cyclofeeder, pumped through a pipeline for a distance sufficient to allow conditioning to occur, and then fed to the sand separator. The sand separator would remove the coarse tailings for disposal, rendering lean bitumen froth. The lean froth could then be pipelined to a froth separation facility. This would reduce both the mass and the volume of material that has to be transported over a long distance to the froth separation facility, or extraction plant, and reduce the distance that the sand must be transported to disposal. There would be a reduction of the volumetric flow rate to the PSVs by some 60%. Further, the bulk of the coarse solids would be removed from the slurry before it is fed into the PSV, which is advantageous for PSV operation.

Another objective of the present invention was to provide a sand separator capable of:

a handling very large oil sand slurry flow rates (up to 40,000 U.S. GPM);

handling large lumps up to 4 inches in diameter;

separating out the bulk of solid particles coarser than 44 microns;

handling slurries with varying compositions containing anywhere between 35–60% solids concentration; and controlling the split in the volumetric flow rate between the light phase and the heavy phase by throttling the effluent flow to optimize separation.

A further objective of the present invention was to provide a sand separator having a low pressure drop in use, thereby allowing separators to be linked in a series without an inter-stage pump. By discharging the coarse sand tailings tangentially, the residual discharge pressure for feeding the next stage is assured. This residual pressure permits the direct connection of a plurality of stages in a series, without inter-stage pumps and pump boxes. The effluent from the last separator can be hooked up directly to a tailings disposal pump.

The invention is based on the discovery that a cylindrical cyclonic separator, having a tangential slurry inlet at one end and a peripheral (preferentially tangential) solids outlet and a central vortex finder outlet at the other end, will satisfactorily desand an oil sand slurry. In operation, provided that sufficient centrifugal force and retention time are provided, the introduced slurry forms an irrotational vortex which separates slurry into an outer layer of coarse solids, an intermediate layer of middlings and an inner core of aerated bitumen. The solids, which combine with some middlings to form a coarse tailings stream, leave through the peripheral outlet. The aerated bitumen, which combines with some middlings to form a lean froth stream, leaves through the vortex finder. It has been determined by testing:

that the lean froth is substantially sand-free;

that the losses of bitumen with the tailings are at acceptable levels; and that the cylindrical separator vessel can handle high flow rates and lumps up to four inches in diameter.

Broadly stated, in one aspect the invention is directed to a novel cyclonic separator for separating coarse solids from bitumen froth comprising:

a closed vessel forming a substantially cylindrical vortex chamber, said vessel having a tangential feed inlet at its first end and a peripheral, preferably tangential, outlet at its second end for the solid effluent; and a tubular vortex finder extending centrally into the cylindrical vortex chamber at its second end, said vortex finder preferably including a vortex holding disc mounted on the lip of the finder, said vortex finder providing an outlet for the centrate or aerated bitumen phase.

In a more preferred embodiment, the separator includes a second tangential inlet at the vessel's first end for the introduction of a second fluid such as dilution water.

In another aspect, the invention is directed to a method for desanding a conditioned aqueous oil sand slurry containing aerated bitumen, water and solids, comprising the steps of:

providing a cyclonic separator having a closed vessel forming an elongated, substantially cylindrical vortex chamber, said vessel having a tangential feed inlet at its first end, a centrally positioned vortex finder at its second end for centrate removal and a peripheral, preferably tangential, outlet for solids removal at its second end, said vortex finder preferably having a vortex holding disc extending radially and outwardly from the rim of the vortex finder;

tangentially introducing the slurry into the chamber at its first end to form a rotating vortex;

centrifugally separating the rotating slurry as it advances through the chamber to form an outer layer containing a major portion of coarse solids, an inner core containing a major portion of the aerated bitumen and an intermediate layer of middlings;

separately removing the aerated bitumen core, together with some middlings, through the vortex finder to produce a lean froth stream for further processing;

separately removing the outer layer, together with some middlings, through the peripheral outlet to produce a tailings stream for disposal; and preferably utilizing more than one cycloseparator in series to minimize bitumen loss in the coarse tailings.

DESCRIPTION OF THE PREFERRED EMBODIMENT

For convenience of description, the following preferred embodiment references the cyclonic separator in its upright position so that the feed inlet is at the top of the apparatus and the product outlets are at the bottom of the apparatus. However, the apparatus may be deployed and operated in virtually any orientation.

Further, the apparatus about to be described is a unit that was tested experimentally. Such a unit would need to be scaled up for commercial application.

Figure 1:
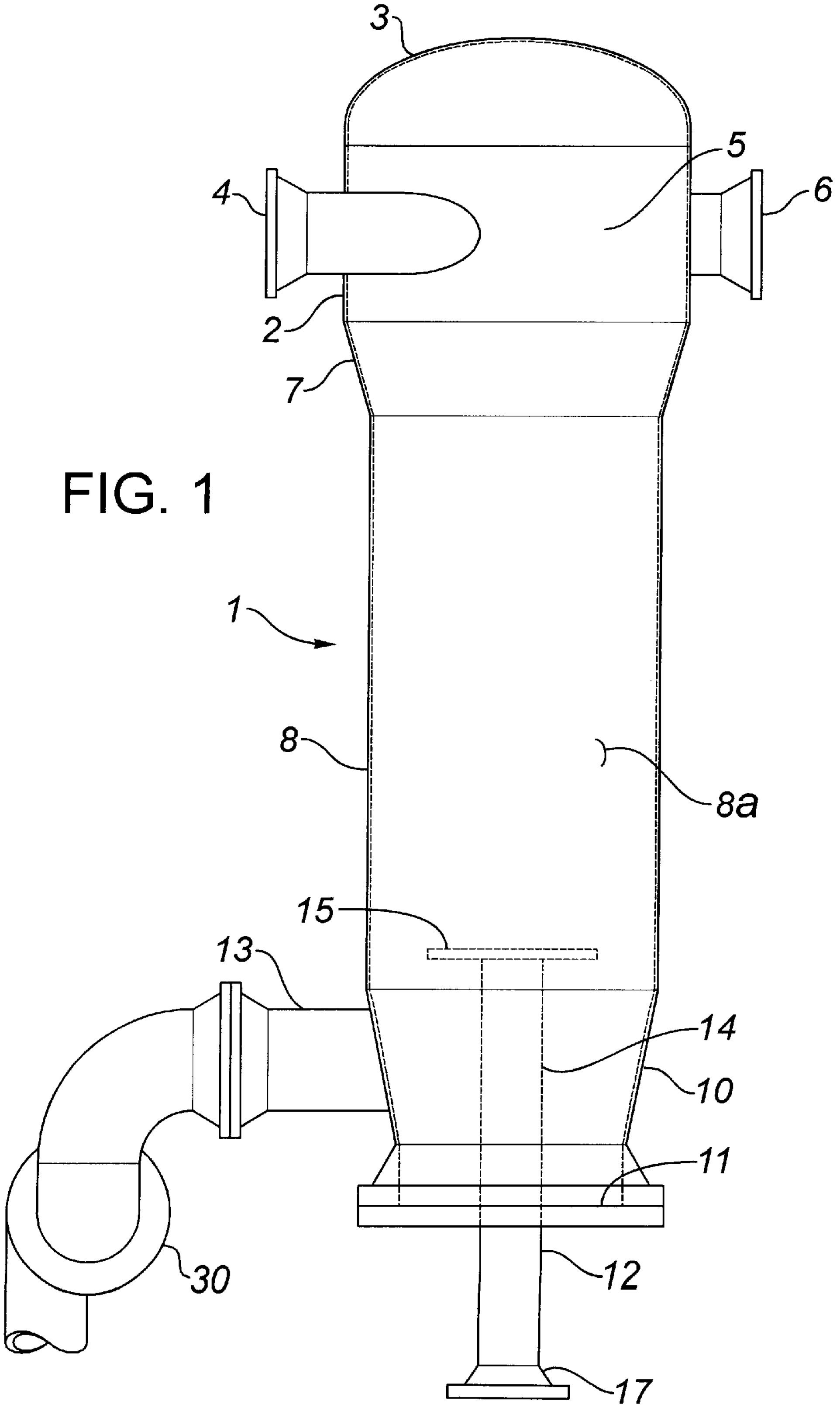
FIG. 1 is a cross-section of the cycloseparator.

FIG. 1 shows in cross-section the cyclonic separator having two tangential inlets, one tangential outlet and a centrally positioned vortex finder. More particularly, the cycloseparator 1 comprises a closed vessel 1*a* having a cylindrical feed section 2, closed by a slightly convex top wall 3. The feed section 2 and top wall 3 form a mixing chamber 2*a*. Affixed tangentially to the feed section 2 is a feed inlet pipe 4 that receives the oil sand slurry directly from a pipeline or the like. The slurry is introduced into the feed section tangentially in order to create a vortex 5. A second fluid inlet pipe 6 is also affixed tangentially to the feed section 2. This inlet pipe 6 receives a second fluid such as water for dilution of the slurry if necessary. The tangential addition of a second fluid also helps in the creation of the slurry vortex.

Attached to the feed section 2 is a converging or conical section 7 for accelerating the tangential velocity of the vortex, thereby enhancing and stabilizing the vortex. The section 7 forms an internal chamber 7*a*. Attached to the converging section 7 is a cylindrical section 8 forming an internal vortex chamber 8*a* of a such a length as to ensure sufficient residence time of the vortex so that separation of solids greater than 44 microns from the bitumen froth will result. Separation in the centrifugal field occurs as a result of the differences in specific gravity; the bitumen froth having a density lower than 1 g/cm$^3$ is displaced to the center of the vortex about the axis of chamber 8*a* while the coarse solids having an average density of 2.65 g/cm$^3$ tend to migrate to the periphery of the spiraling fluid.

A second converging section 10 is attached to the cylindrical section 8 and forms an internal bottom chamber or effluent chamber 10*a*. An end wall 11 closes the vessel 1*a* at its bottom end. An outlet pipe 13, communicating with the effluent chamber 10*a* at its periphery extends tangentially from the second section 10. The coarse solids-containing effluent exits through pipe 13.

Extending upwardly through end wall 11 into the effluent chamber 10*a* and partially into the vortex chamber 8*a* is the centrally mounted tubular vortex finder 14. The finder 14 is equipped with an annular vortex holding disc 15 attached to its upper rim 16. The vortex holding disc 15 helps to prevent the vortex from wandering and therefore prevents the centrate from discharging into the effluent. The vortex finder 14 forms an outlet 17 for the centrate. The inner diameter of the vortex finder 14 is such that only the bitumen froth and part of the middlings exit through the vortex finder.

Figure 2:
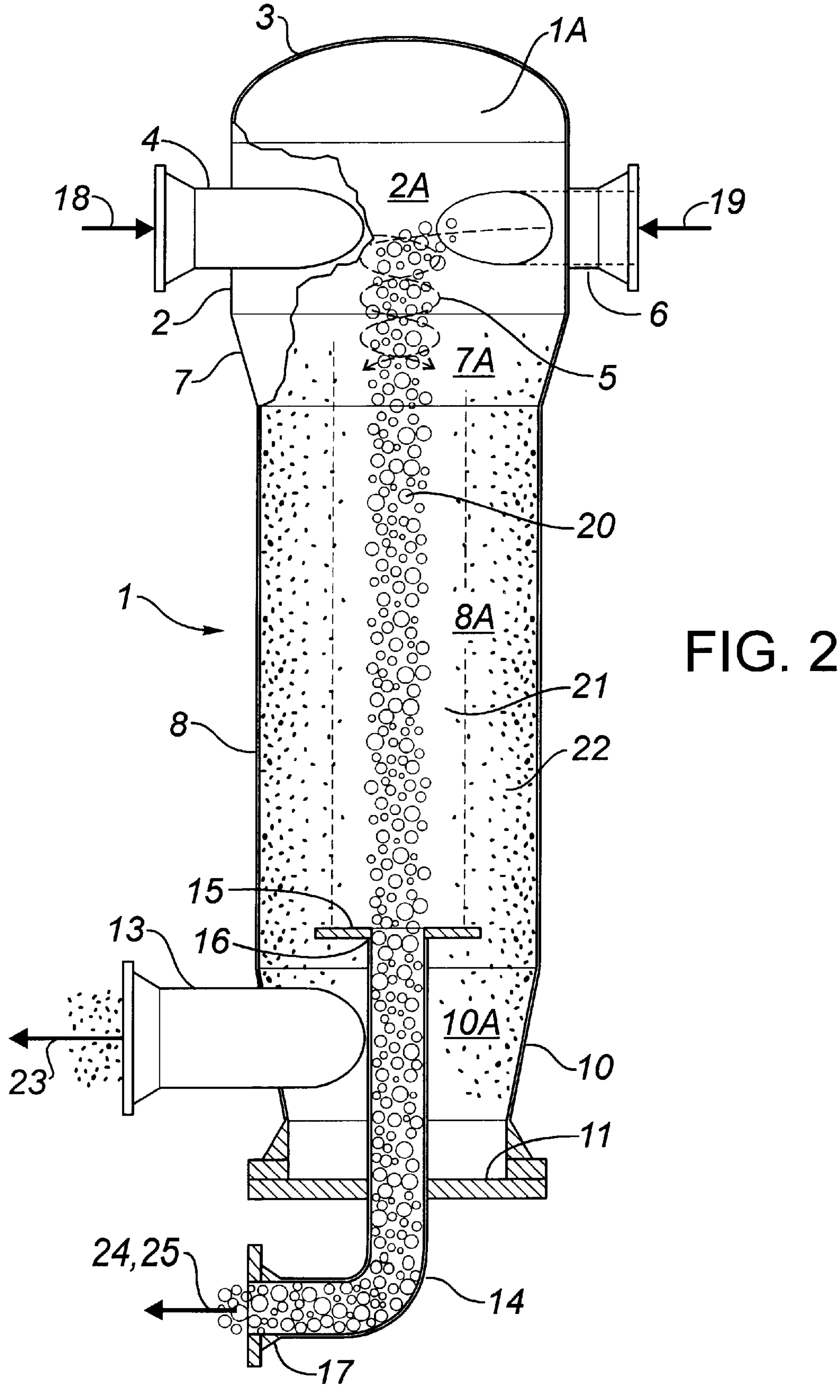
FIG. 2 is a cross-section of the cycloseparator showing the separation of coarse tailings from bitumen froth and middlings.

The process for separating bitumen froth and middlings from the coarse tailings can be better understood with reference to FIG. 2. This process of separation is termed co-current centrifugal separation because both products flow in the same direction in a centrifugal field.

Oil sand slurry 18 is tangentially introduced into the cylindrical feed section 2 of the cycloseparator 1 via the large diameter tangential slurry inlet 4 at a sufficient feed rate and velocity to form the vortex 5. Dilution water 19 is simultaneously added to the cycloseparator 1 via the second tangential inlet 6. The dilution water 19 mixes with the slurry and assists in the formation of the vortex.

The diluted slurry then passes through the transitional converging chamber 7*a* and into the cylindrical vortex chamber 8. The step down in diameter between the feed chamber 2*a* and the vortex chamber 8 accelerates the tangential velocity of the diluted slurry due to momentum conservation, thereby enhancing and stabilizing the vortex 5. Once the slurry is in the vortex chamber 8, the aerated bitumen froth forms the core 20 of the vortex 5. A layer 21 of middlings surrounds the bitumen froth core 20. The coarse tailings migrate to the outside of the vortex 5 and form a layer 22. By the time the vortex 5 reaches the vortex holding disc 15, the sand and other large objects such as rocks and lumps are at the periphery of the vortex chamber 8 and therefore by-pass the disc 15 and hence the finder 14. These coarse tailings continue down through the vortex chamber 8 to the effluent chamber 10*a* where they are tangentially discharged from the separator via the outlet pipe 13.

The centrate comprised of aerated bitumen froth and middlings is discharged through the vortex finder 14. The vortex holding disc 15 helps to ensure that the centrate does not exit via the tangential outlet pipe 13.

The volumetric flow ratio between the light centrate (bitumen froth and middlings) and the heavy effluent (rocks, lumps and sand) can be controlled by throttling the effluent flow by means of a pump 30, a valve or a second stage cycloseparator. The percent flow of heavy effluent versus light centrate is determined by the initial density of the slurry feed. This is an important feature in that the density of oil sand slurry preparations will vary greatly depending upon the grade of oil sand used, the time of year the slurry was prepared, the technique employed to mix oil sand with water, etc.

The pressure drop in the cycloseparator is relatively low (typically 2 to 3 p.s.i.). Therefore, it is possible to connect two or more cycloseparators in a series without having to use interstage pumps.

The following example shows how the cycloseparator can be used to obtain a bitumen froth stream and a separate coarse tailings stream from oil sand slurry.

EXAMPLE

Figure 3:
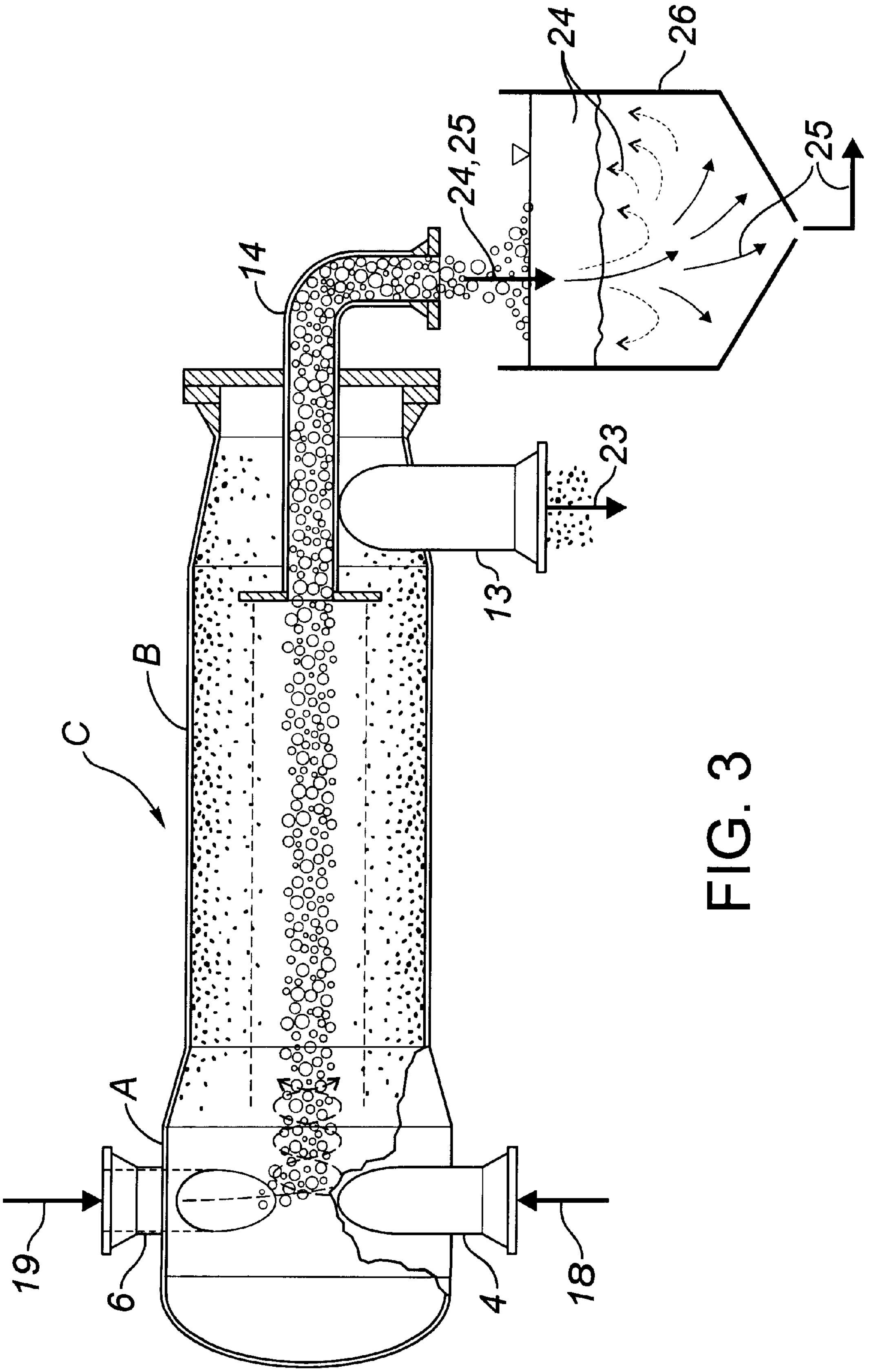
FIG. 3 is a schematic showing a test circuit including the cycloseparator.

A system in accordance with FIG. 3 was used for the following experiment. Multiphase 3-dimensional computer flow simulations were performed to model the hydraulics in the centrifugal vortex in the cycloseparator. The results of the simulations were used to optimize the geometry of the separator and its performance. The dimensions of the cycloseparator used in the following experiment are shown in Table 1.

TABLE 1

| | Dimensions |
|---|---|
| Mixing Chamber A | 36 inches in diameter |
| Vortex Chamber B | 30 inches in diameter and 60 inches in length |
| Cycloseparator C | 112 inches in length |

In the irrotational vortex formed in the cycloseparator, the tangential slurry velocity increases towards the center according to the law of momentum conservation. Hence, the highest centrifugal forces exist along the axis of the vortex and diminish towards the periphery. The elongated cylindrical vortex chamber combined with the co-current flow regime allows for extended residence time in the centrifugal field.

Oil sand slurry was prepared by mixing as-mined oil sand with water at either 50° C. or 30° C. The density of the slurry was adjusted to 1.52 S.G. The slurry was first mixed in a mixing vessel for 15 minutes and then discharged from the mixing vessel to the separator via a pump through a 10 inch inner diameter pipe that was connected to the tangential feed inlet. The inlet velocity of the slurry was 3.5 m/s. Water, in the amount of twenty percent by volume of the main flow of the slurry, was simultaneously added via the second tangential inlet to dilute the slurry.

The coarse tailings were removed via the bottom tangential outlet into a collection vessel at a flow rate equal to the pipeline flow rate. The bitumen froth and middlings exited via the vortex finder and were collected in a holding tank. Gravity separation of the middlings from the bitumen froth occurred rapidly in the holding tank and a layer of oily froth formed almost immediately while the middlings settled at the bottom of the holding tank.

The following table lists the compositions, in weight percent, of the initial slurry, the coarse tailings and the bitumen froth layer produced.

TABLE 2

| | Wt % Bitumen | Wt % Water | Wt % Solids |
|---|---|---|---|
| Oil Sand Slurry | 5.8 | 28.0 | 66.2 |
| Coarse Tailings | 1.05 | 35.6 | 63.4 |
| Bitumen Froth Layer | 63.8 | 23.0 | 13.2 |

Table 2 shows that the bitumen froth layer was comprised primarily of bitumen and the coarse tailings was comprised primarily of solids.

The embodiments of the invention in which an exclusive property or privilege is claimed are defined as follows:

1. A method for desanding a conditioned aqueous oil sand slurry comprising aerated bitumen, water and sand to produce pumpable, pipelineable lean froth and tailings, comprising the steps of:

providing a separator vessel having first and second ends and forming an elongated cylindrical separation chamber, said vessel having a tangential slurry inlet at its first end, a centrally positioned vortex finder at its second end, said vortex finder having its first end positioned in the separation chamber and its second end extending outside the separation chamber, and a peripheral sand removal outlet at its second end;

continually tangentially introducing slurry into the chamber at its first end to form a rotating vortex;

subjecting the rotating slurry to centrifugal force in the separation chamber for sufficient retention time for the slurry to separate into an outer layer containing a major portion of the sand, an inner core containing a major portion of the aerated bitumen and an intermediate middlings layer;

separately removing the core, together with some middlings, through the vortex finder to produce a lean froth stream; and separately removing the outer layer, together with some middlings, through the peripheral outlet to produce a tailings stream.

2. A method as set forth in claim 1 wherein said separator vessel has a second tangential inlet at its first end for the introduction of a second fluid and includes the step of continually tangentially introducing a second fluid into said vessel at its first end to dilute the slurry.

3. A method as set forth in claim 1 wherein said vortex finder has a vortex holding disc extending radially and outwardly from the rim of the vortex finder.

4. A method as set forth in claim 1 or 2 wherein said peripheral sand removal outlet is tangential.

5. A method as set forth in claim 1 or 2 comprising providing a pump connected to the peripheral sand removal outlet and controlling the ratio of the tailings to lean froth to minimize loss of oil with the tailings.

6. A cyclonic separator for desanding a conditioned aqueous oil sand slurry comprising aerated bitumen, water and sand to produce pumpable, pipelineable lean froth and tailings comprising:

a closed vessel having first and second ends and forming an elongated, substantially cylindrical separation chamber, said vessel having a tangential feed inlet at its first end; a centrally positioned vortex finder at its second end for centrate removal, said vortex finder having its first end positioned in the separation chamber and its second end extending outside the separation chamber; and a peripheral outlet at its second end for solids removal wherein said outlet means is tangential.

7. A cyclonic separator as set forth in claim 6 wherein said vessel has a second tangential inlet at its first end for the introduction of dilution water.

8. A cyclonic separator as set forth in claim 6 wherein said vortex finder has a vortex holding disc extending radially and outwardly from the rim of the vortex finder.

9. A cyclonic separator for desanding a conditioned aqueous oil sand slurry comprising aerated bitumen, water and sand to produce pumpable, pipelineable lean froth and tailings comprising:

a closed vessel having first and second ends, a side wall and first and second end walls, said vessel forming a separation chamber, said vessel comprising, in sequence from its first end wall, a cylindrical feed section, a first converging section of downwardly diminishing diameter, an elongated cylindrical vortex section, and a second converging section of downwardly diminishing diameter;

the side wall forming tangential feed inlet means communicating with the separation chamber at the feed section;

the side wall forming outlet means communicating with the separation chamber and leading from the periphery of the second converging section wherein said peripheral outlet is tangential; and a vortex finder, centrally positioned in the second end of the separation chamber, extending through the second end wall and communicating with the separation chamber.

10. A cyclonic separator as set forth in claim 9 wherein said vessel has a second tangential inlet means extending through the side wall at its first end and communicating with the separation chamber.

11. A cyclonic separator as set forth in claim 9 or 10 wherein said vortex finder has a vortex holding disc extending radially and outwardly from the rim of the vortex finder.

12. A method for desanding a conditioned aqueous oil sand slurry comprising aerated bitumen, water and sand to produce pumpable, pipelineable lean froth and tailings, comprising the steps of:

providing a cyclonic separator comprising a closed vessel having first and second ends, said vessel having a side wall and first and second end walls and forming a separation chamber, said vessel comprising, in sequence from its first end wall, a cylindrical feed section, a first converging section of diminishing diameter, an elongated cylindrical vortex section, and a second converging section of diminishing diameter, said vessel also comprising a tangential feed inlet means extending through the side wall and communicating with the separation chamber at the feed section, an outlet means communicating with the separation chamber and leading from the periphery of the second converging section, and a vortex finder, centrally positioned in the lower end of the separation chamber, extending through the second end wall and communicating with the separation chamber;

continually tangentially introducing slurry into the cylindrical feed section of said vessel to form a rotating vortex;

passing the slurry through the first converging section to accelerate the rotating vortex;

passing the slurry through the elongated cylindrical vortex section thereby subjecting the rotating slurry to centrifugal force for sufficient retention time for the slurry to separate into an outer layer containing a major portion of the sand, an inner core containing a major portion of the aerated bitumen and an intermediate middlings layer;

separately removing the core, together with some middlings, through the vortex finder to produce a lean froth stream; and separately removing the outer layer, together with some middlings, through the outlet means to produce a tailings stream.

13. A method as set forth in claim 17 wherein said vessel has a second tangential inlet at its first end for the introduction of a second fluid and includes the step of continually tangentially introducing a second fluid into said vessel at its first end to dilute the slurry.

14. A method as set forth in claim 12 wherein said vortex finder has a vortex holding disc extending radially and outwardly from the rim of the vortex finder.

15. A method as set forth in claim 12 wherein said outlet means is tangential.

16. A method as set forth in claim 12 comprising providing a pump connected to the outlet means and controlling the ratio of the tailings to centrate to minimize loss of oil with the tailings.

* * * * *